US012756844B2

(12) United States Patent
Kim

(10) Patent No.: US 12,756,844 B2
(45) Date of Patent: Oct. 6, 2026

(54) METHOD FOR OPTIMIZING ENCODING THROUGH VIDEO CATEGORY CLASSIFICATION BASED ON ARTIFICIAL INTELLIGENCE, AND DEVICE AND SYSTEM THEREFOR

(71) Applicant: Seung Mo Kim, Incheon (KR)

(72) Inventor: Seung Mo Kim, Incheon (KR)

( * ) Notice: Subject to any disclaimer, the term of this patent is extended or adjusted under 35 U.S.C. 154(b) by 0 days.

(21) Appl. No.: 18/923,282

(22) Filed: Oct. 22, 2024

(65) Prior Publication Data

US 2026/0075220 A1 Mar. 12, 2026

(30) Foreign Application Priority Data

Sep. 9, 2024 (KR) ........................ 10-2024-0122471

(51) Int. Cl.
*H04N 19/33* (2014.01)
*G06V 10/44* (2022.01)
*G06V 10/764* (2022.01)
*H04N 19/154* (2014.01)
*H04N 19/177* (2014.01)

(52) U.S. Cl.
CPC ........... *H04N 19/177* (2014.11); *G06V 10/44* (2022.01); *G06V 10/764* (2022.01); *H04N 19/154* (2014.11)

(58) Field of Classification Search
CPC .... G06V 10/44; G06V 10/764; H04N 19/177; H04N 19/154
See application file for complete search history.

(56) References Cited

U.S. PATENT DOCUMENTS 7,738,550 B2 * 6/2010 Kuhn .................. H04N 19/177 375/240.01
8,879,856 B2 * 11/2014 Raveendran ........... H04N 19/87 375/240
8,879,857 B2 * 11/2014 Raveendran ........... H04N 19/18 375/240

(Continued)

FOREIGN PATENT DOCUMENTS

EP 0677969 A2 * 10/1995 ........... H04N 19/172
KR 10-1136858 B1 4/2012
KR 10-2437309 B1 8/2022

OTHER PUBLICATIONS

Christopher M. Bishop, "Super-resolution Enhancement of Video" International Workshop on Artificial Intelligence and Statistics (AISTATS 2003), No. 9th, Jan. 2003, pp. 1-8 (Year: 2003).*

*Primary Examiner* — Philip P. Dang
(74) *Attorney, Agent, or Firm* — Bridgeway IP Law Group, PLLC; Jihun Kim

(57) ABSTRACT

Proposed are a method for optimizing encoding through video category classification based on artificial intelligence, and a device and a system therefor. A method for optimizing video encoding based on artificial intelligence includes dividing an input video file into groups of pictures (GOPs), performing classification of a category and extraction of feature information on each of the groups of pictures resulting from division, estimating, on the basis of the extracted feature information, a compression option value corresponding to the classified category, performing GOP-by-GOP encoding by applying the compression option value, and combining GOP-by-GOP encoded files to generate an entire video file transcoded.

6 Claims, 8 Drawing Sheets

(56) References Cited

U.S. PATENT DOCUMENTS

| | | | | |
|---|---|---|---|---|
| 9,197,912 | B2 * | 11/2015 | Raveendran | H04N 19/154 |
| 10,154,281 | B2 * | 12/2018 | Tian | H04N 19/593 |
| 10,419,785 | B2 * | 9/2019 | Davies | H04N 21/236 |
| 10,528,819 | B1 * | 1/2020 | Manmatha | G06V 10/764 |
| 10,582,205 | B2 * | 3/2020 | Wang | G06F 18/22 |
| 10,681,361 | B2 * | 6/2020 | Wang | G06T 3/4053 |
| 11,343,492 | B2 * | 5/2022 | Chadwick | H04N 19/149 |
| 11,671,604 | B1 * | 6/2023 | Khsib | G06N 5/04<br>375/240.03 |
| 11,989,943 | B2 * | 5/2024 | Stenger | G06V 20/46 |
| 12,212,772 | B2 * | 1/2025 | Kim | G06N 3/04 |
| 12,348,743 | B2 * | 7/2025 | Kwong | H04N 19/85 |
| 12,355,941 | B2 * | 7/2025 | Li | H04N 19/179 |
| 2007/0071087 | A1 * | 3/2007 | Kim | H04N 19/14<br>375/E7.176 |
| 2017/0142424 | A1 * | 5/2017 | Jun | H04N 19/184 |
| 2023/0195519 | A1 * | 6/2023 | Krishnan | G06F 9/4893<br>713/320 |
| 2023/0239516 | A1 * | 7/2023 | Mao | H04N 19/70<br>375/240.12 |
| 2024/0007658 | A1 * | 1/2024 | Mao | H04N 19/124 |
| 2024/0146524 | A1 * | 5/2024 | Xu | H04L 9/088 |
| 2024/0275996 | A1 * | 8/2024 | Debnath | A61B 34/25 |
| 2024/0323441 | A1 * | 9/2024 | Guo | G06T 9/00 |
| 2024/0348801 | A1 * | 10/2024 | Possos | H04N 19/172 |

* cited by examiner

METHOD FOR OPTIMIZING ENCODING THROUGH VIDEO CATEGORY CLASSIFICATION BASED ON ARTIFICIAL INTELLIGENCE, AND DEVICE AND SYSTEM THEREFOR

CROSS-REFERENCE TO RELATED APPLICATION

This application claims the benefit of Korean Patent Application No. 10-2024-0122471 filed on Sep. 9, 2024, in the Korean Intellectual Property Office, the entire disclosure of which is incorporated herein by reference for all purposes.

BACKGROUND OF THE INVENTION

Field of the Invention

The present disclosure relates to video category classification. More particularly, the present disclosure relates to a technology for providing encoding optimized for each category through video category classification based on an artificial intelligence model.

Description of the Related Art

Recently, multimedia information has been provided in which videos and sounds are combined with telecommunications and computers and fused into new media. For example, as high-speed data transmission networks are provided, high-quality videos with stereo sounds can be viewed and videotelephony allows for face-to-face calls between users. In addition, products can be purchased while product information is viewed in real time through computers or TVs, and music or movies can be enjoyed through streaming websites. In addition, video lectures can be taken, news can be watched, or live sports broadcasting can be watched through computers or smart phones.

These types of multimedia information have been under development on the basis of video compression (that is, encoding) technology. Pieces of multimedia information can be compressed by removing redundant elements (elements that are not strictly necessary to accurately restore data). In the case of lossy compression, data restored at a decoder is not identical to the original data, but subjective redundant elements are removed to achieve high compression efficiency. In image or video compression, subjective redundant elements mean elements that can be removed without significantly affecting the quality that a viewer intuitively perceives.

Pieces of multimedia information may be classified into various categories, and qualities required for respective categories may vary. Therefore, a technology for classifying pieces of multimedia information into categories and performing optimal encoding according to the classified categories is required.

As an example of video compression technology, Korean Patent No. 10-1136858 (registration date, 9 Apr. 2012) discloses an encoding technology in a video compression standard.

As an example of video category classification technology, Korean Patent No. 10-2437309 (registration date, 24 Aug. 2022) discloses an apparatus for classifying an image category using deep learning, and a method thereof, wherein a preprocessing function is performed on video data and a CNN model is used with preprocessed images as input values to classify a category of the video data related to the preprocessed images.

The foregoing is intended merely to aid in the understanding of the background of the present disclosure, and is not intended to mean that the present disclosure falls within the purview of the related art that is already known to those skilled in the art.

SUMMARY OF THE INVENTION

Embodiments of the present disclosure are directed to providing a method for optimizing encoding through video category classification based on artificial intelligence, and a device and a system therefor.

In addition, embodiments of the present disclosure are directed to providing a method for optimizing encoding through video category classification based on artificial intelligence, and a device and a system therefor, wherein an optimal compression option value is estimated through GOP (Group Of Pictures)-by-GOP category classification and feature analysis for an input video file to perform optimal transcoding.

In addition, embodiments of the present disclosure are directed to providing a method for optimizing encoding through video category classification based on artificial intelligence, and a device and a system therefor, wherein an optimized compression option is extracted through compression efficiency and video quality analysis based on artificial intelligence without performing physical encoding for an entire video.

It is to be understood that technical problems to be solved by the present disclosure are not limited to the aforementioned technical problems and other technical problems which are not mentioned will be apparent from the following description to a person with an ordinary skill in the art.

According to one aspect of the present disclosure, there is provided a method for optimizing video encoding based on artificial intelligence, the method including: dividing an input video file into groups of pictures (GOPs); performing classification of a category and extraction of feature information on each of the groups of pictures resulting from division; estimating, on the basis of the extracted feature information, a compression option value corresponding to the classified category; performing GOP-by-GOP encoding by applying the compression option value; and combining GOP-by-GOP encoded files to generate an entire video file transcoded.

In an embodiment, the method may further include determining a feature element for determining the compression option value for each of the classified categories, wherein the compression option value may be a value corresponding to the determined feature element.

In an embodiment, the feature element may include a video feature element and an image feature element, and the video feature element may include at least one selected from a group of bitrate, constant rate factor (CFR), quantization, framerate, interlace, frame type, a size of the group of pictures, and variation, and the image feature element may include complexity or resolution or both.

In an embodiment, the category may include at least one selected from a group of a sports category, a news category, a lecture category, a movie category, and other categories.

In an embodiment, the method may further include: analyzing compression efficiency and video quality using artificial intelligence without physical encoding of the entire video file; and optimizing the compression option value on the basis of a result of analysis, wherein GOP-by-GOP encoding may be performed on the basis of the optimized compression option value.

According to another aspect of the present disclosure, there is provided a computing device including: a processor configured to execute instructions; and a memory configured to store the instructions, wherein the instructions are designed to divide an input video file into groups of pictures (GOPs), perform classification of a category and extraction of feature information on each of the groups of pictures resulting from division, estimate, on the basis of the extracted feature information, a compression option value corresponding to the classified category, perform GOP-by-GOP encoding by applying the compression option value, and combine GOP-by-GOP encoded files to generate an entire video file transcoded.

In an embodiment, the processor may be configured to determine a feature element for determining the compression option value for each of the classified categories, and the compression option value may be a value corresponding to the determined feature element.

In an embodiment, the feature element may include a video feature element and an image feature element, and the video feature element may include at least one selected from a group of bitrate, constant rate factor (CFR), quantization, framerate, interlace, frame type, a size of the group of pictures, and variation, and the image feature element may include complexity or resolution or both.

In an embodiment, the category may include at least one selected from a group of a sports category, a news category, a lecture category, a movie category, and other categories.

In an embodiment, the processor may be configured to analyze compression efficiency and video quality using artificial intelligence without physical encoding of the entire video file, and optimize the compression option value on the basis of a result of analysis, wherein GOP-by-GOP encoding may be performed on the basis of the optimized compression option value.

It is to be understood that technical problems to be solved by the present disclosure are not limited to the aforementioned technical problems and other technical problems which are not mentioned will be apparent from the following description to a person with an ordinary skill in the art to which the present disclosure pertains.

The present disclosure can provide a method for optimizing encoding through video category classification based on artificial intelligence, and a device and a system therefor.

In addition, the present disclosure can provide a method for optimizing encoding through video category classification based on artificial intelligence, and a device and a system therefor, wherein an optimal compression option value can be estimated through GOP (Group Of Pictures)-by-GOP category classification and feature analysis for an input video file to perform optimal transcoding.

In addition, the present disclosure can provide a method for optimizing encoding through video category classification based on artificial intelligence, and a device and a system therefor, wherein an optimized compression option value can be extracted through compression efficiency and video quality analysis based on artificial intelligence without performing physical encoding for an entire video.

In addition to this, there may be a variety of other effects that are identified directly or indirectly through this document.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION OF THE INVENTION

Figure 1:
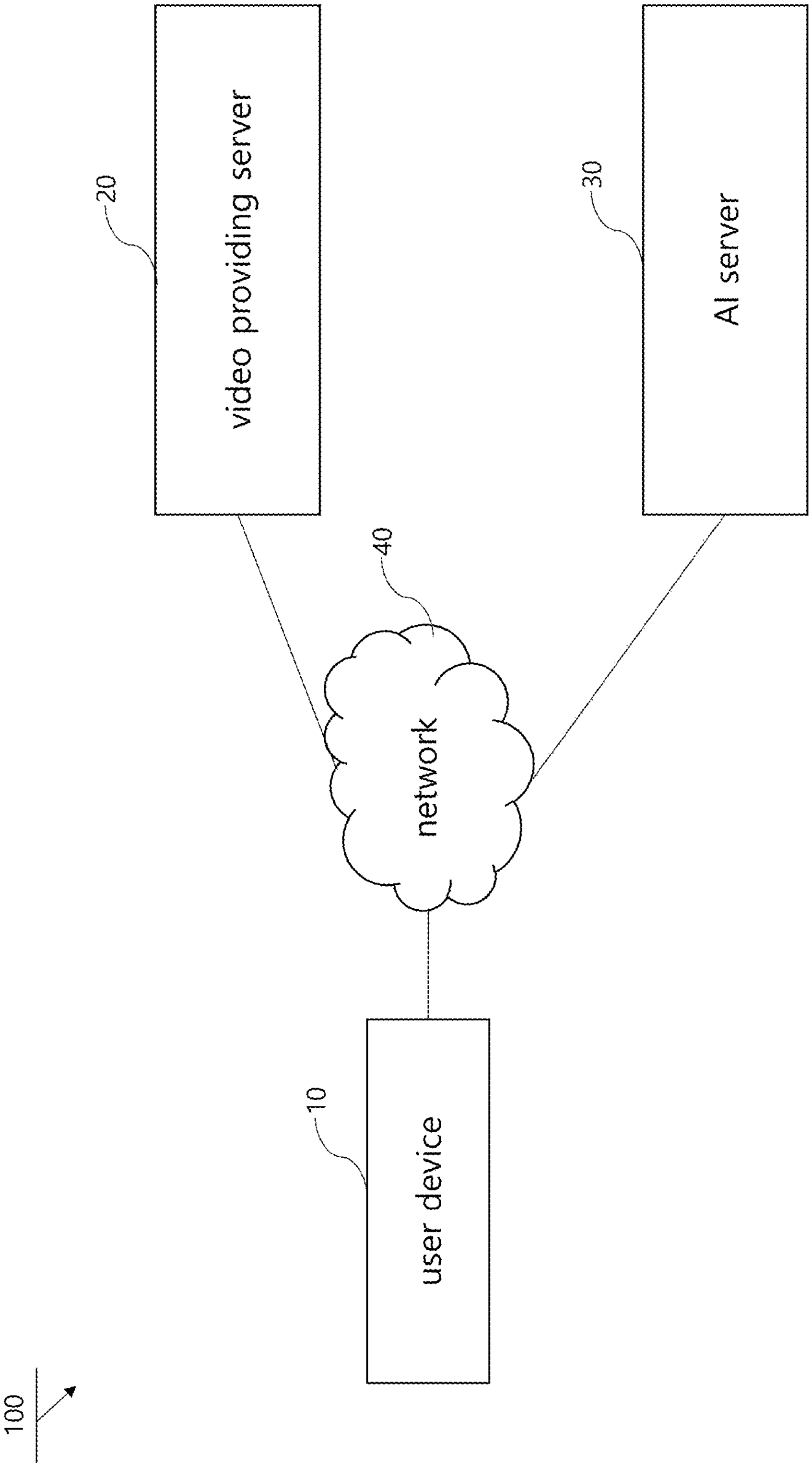
FIG. 1 is a diagram illustrating a configuration of a system according to an embodiment of the present disclosure.

Hereinafter, some embodiments of the present disclosure will be described in detail with reference to the accompanying drawings. It is to be noted that in assigning reference numerals to elements in the drawings, the same reference numerals designate the same elements throughout the drawings although the elements are shown in different drawings. In addition, in describing the embodiments of the present disclosure, the detailed descriptions of known related constitutions or functions thereof may be omitted if they make the gist of the present disclosure unclear.

When describing the elements of the embodiments of the present disclosure, terms such as first, second, A, B, (a), or (b) may be used. Since these terms are provided merely for the purpose of distinguishing the elements from each other, they do not limit the nature, sequence or order of the elements. In addition, unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of the relevant art and will not be interpreted in an idealized or overly formal sense unless expressly so defined herein.

In various examples of the present disclosure, "/" and "," should be construed to mean "and/or". For example, "A/B" may mean "A and/or B". Further, "A, B" may mean "A and/or B". Further, "A/B/C" may mean "at least one of A, B, and/or C". Further, "A, B, C" mean "at least one of A, B, and/or C".

In various examples of the present disclosure, "or" should be construed to mean "and/or". For example, "A or B" may include "only A", "only B", and/or "both A and B". In other words, "or" should be construed to mean "additionally or alternatively".

Hereinafter, embodiments of the present disclosure will be described in detail with reference to FIGS. 1 to 8.

FIG. 1 is a diagram illustrating a configuration of a system according to an embodiment of the present disclosure.

Referring to FIG. 1, a system 100 may include a user device 10, a video providing server 20, an AI server 30, and a network 40.

The user device 10 may be a stationary terminal or a mobile terminal realized as a computer system. Examples of the user device 10 may include a smart phone, a mobile phone, a navigation device, a desktop computer, a laptop computer, a digital broadcast terminal, a personal digital assistant (PDA), a portable multimedia player (PMP), a tablet PC, a game console, a wearable device, an Internet-of-things (IoT) device, a virtual reality (VR) device, an augmented reality (AR) device, and a vehicle terminal.

The network 40 may include a wired network and/or wireless network. The wired network may include an Internet network. Examples of the wireless network may include a mobile communication network, a vehicle-specific communication wireless network, and a Wi-Fi network. For example, mobile communication networks may include a long-term evolution (LTE) network, and a 5G new radio (NR) access network, but are not limited thereto.

The video providing server 20 may transmit a video file to the user device 10 over the network 40.

The user device 10 may be equipped with a video player (or a multimedia playback application) to play a video file received from the video providing server 20.

The AI server 30 may transcode the video at the request of the video providing server 20 and may provide the transcoded video to the video providing server 20.

The AI server 30 according to an embodiment may divide a video file received from the video providing server 20 into groups of pictures (GOPs) and may classify the category and extract feature information for each of the GOPs resulting from division.

The AI server 30 may determine, on the basis of the classified category information and feature information, the optimal feature element for the category. Herein, the feature element may include at least selected from the group of a video feature element and an image feature element.

The AI server 30 may estimate a compression option value corresponding to a feature element determined using a compression option prediction model generated through pre-training for each category.

The AI server 30 may perform GOP-by-GOP encoding on the basis of the estimated compression option value and then combine the GOP-by-GOP encoded files to generate an entire video file.

The AI server 30 may transmit the generated video file to the video providing server 20 over the network 40.

The AI server 30 according to an embodiment may re-estimate an estimated compression option value using the pre-trained compression option optimization model. In this case, the AI server 30 may perform GOP-by-GOP encoding on the basis of the re-estimated optimal compression option value and then combine the GOP-by-GOP encoded files to generate an entire video file.

Hereinafter, video and image feature elements will be described.

A video feature element according to an embodiment of the present disclosure may include at least one selected from the group of bitrate, constant rate factor (CFR), quantization, framerate, interlace, frame type, a group of pictures (hereinafter, referred to as "GOP"), and variation.

The bitrate is one of the most important features related to compression (encoding), and means how many bits (or kilobits) per second a data stream is. When the data stream has a constant bitrate, this is called a constant bitrate (hereinafter, referred to as "CBR"). When the data stream has varying bitrates over time, this is called a variable bitrate (hereinafter, referred to as "VBR"). Thus, the bitrate is directly related to the capacity of the video.

The CRF is a value for determining the quality, that is, image quality, in quality mode encoding. The smaller the value, the higher the quality. The CRF is commonly used as a constant quality (cq) that is a parameter option in an encoder.

Quantization is a procedure of quantifying to perform lossy compression during encoding, and the parameter for determining a loss criterion is called a quantizer or a quantization parameter (QP). The smaller the quantizer, the higher the quality. Quantizer 0 means lossless compression.

In an encoding mode, the quantizer/quality/bitrate is the basis for determining the loss rate of original data in lossy compression.

Hereinafter, types of video frames will be briefly described.

Video frames may be roughly divided into I frame, P frame, and B frame.

I frame (Intra-coded frame) is an independent reference frame that does not reference other frames for compression/decompression.

P frame (predictive-coded frame) is a frame that references to a particular number of preceding frames for compression/decompression, and only the difference in motion from the referenced frames is recorded. For example, "Ref Frames" information in H.264 shown in MediaInfo means the number of preceding frames that P frame references.

B frame (bipredictive-coded frame) is a frame that references a particular number of preceding frames and following frames for compression/decompression, and only the difference in motion from the referenced frames is recorded.

A group of pictures (hereinafter, referred to as "GOP") is a collection of one I-frame and other frames related thereto, and a GOP size means the size of the collection. Herein, I-frame is a key frame of the GOP, which is interchangeable with IDR frame.

GOPs may be roughly divided into a closed GOP and an open GOP.

A closed GOP means a GOP in which frames within the GOP are not allowed to reference frames of other GOPs.

An open GOP means a GOP in which frames within the GOP reference frames of other GOPs, for example, the preceding GOP, which increases compression efficiency and the complexity of encoding and decoding.

Currently, a closed GOP is set as the default value for H.264, and an open GOP is set as the default value for HEVC. Herein, setting an open GOP as the default value means that open GOPs are allowed, not that all GOPs are open GOPs.

A variation may mean various characteristic elements for specifying the difference between the previous frame and the current frame of the video. For example, the variation may include variation for each frame pixel, variation in motion for each frame, and variation in objects for each frame, but without being limited thereto, may include RGB variation for each frame, variation in object positions for each frame, and variation in background for each frame.

An image feature element according to the present disclosure may include complexity and resolution.

Complexity may include all characteristic elements that may specify the complexity of an image. For example, complexity may include at least one selected from the group of the number of colors for each image, the number of objects for each image, the saturation for each image, the brightness for each image, a frequency value for each image pixel, and an edge, but without being limited thereto, may include a variation in background for each image, and a variation in distance between objects within an image.

Resolution means how many pixels are included in one frame. Resolution is expressed as the number of pixels in the horizontal direction x the number of pixels in the vertical direction, and the product thereof is the number of pixels simultaneously displayed on the screen.

Figure 2:
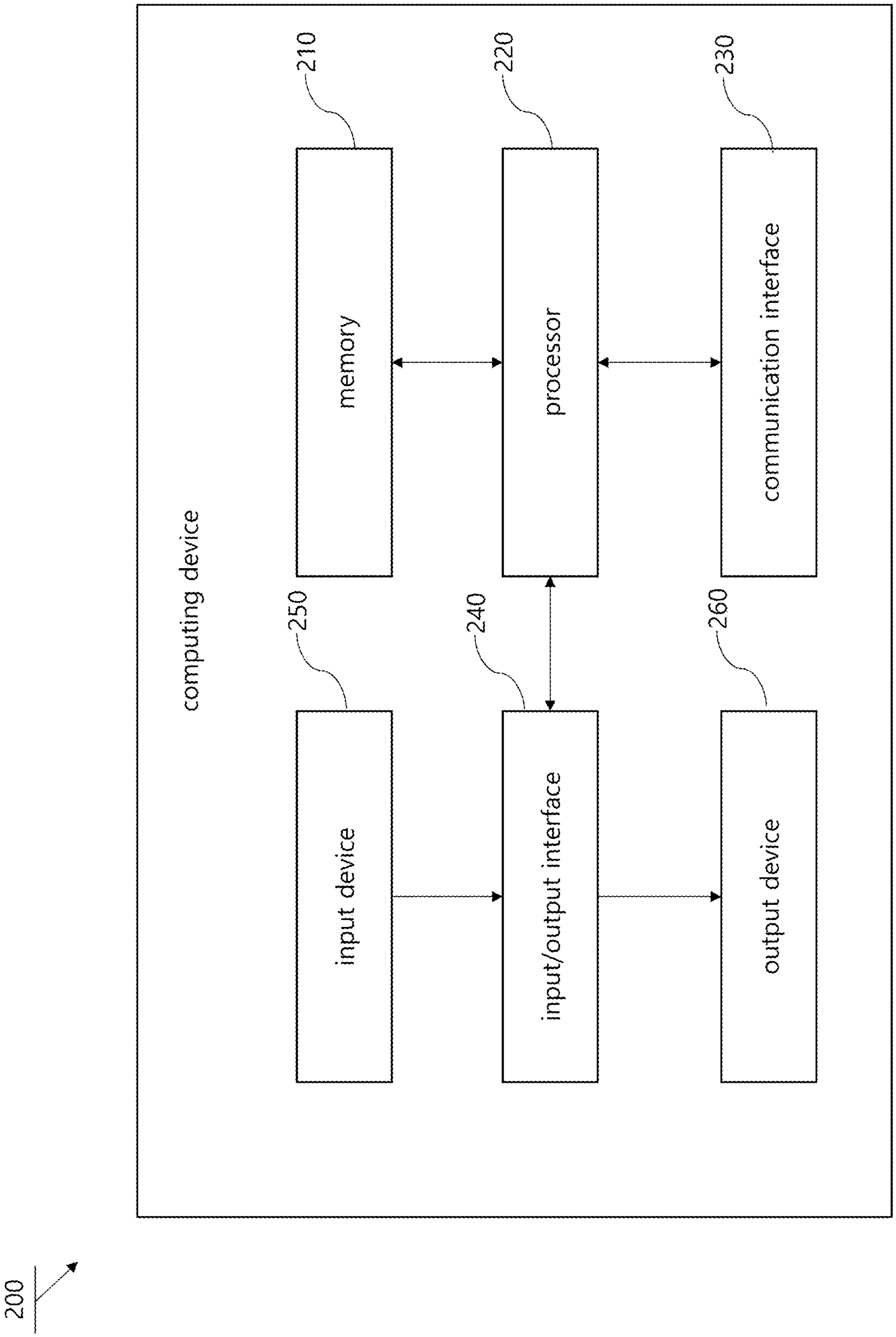
FIG. 2 is a block diagram illustrating a configuration of a computing device according to an embodiment of the present disclosure.

FIG. 2 is a block diagram illustrating a configuration of a computing device according to an embodiment of the present disclosure.

The computing device shown in FIG. 2 may be provided in the AI server 30 shown in FIG. 1.

Referring to FIG. 2, a computing device 200 may include at least one selected from the group of a memory 210, a processor 220, a communication interface 230, an input/output interface 240, an input device 250, and an output device 260.

The memory 210 is a computer-readable recording medium, and may include a permanent mass storage device, such as a random-access memory (RAM), a read-only memory (ROM), and a disk drive. Herein, the permanent mass storage device, such as a ROM and a disk drive, may be included in the computing device 200 as a separate persistent storage device distinct from the memory 210. In addition, the memory 210 may store an operating system and at least one program code. These software elements may be loaded into the memory 210 from a computer-readable recording medium separate from the memory 210. Examples of this separate computer-readable recording medium may include a computer-readable recording medium, such as a floppy drive, a disk, a tape, a DVD/CD-ROM drive, and a memory card. In another embodiment, the software elements may be loaded into the memory 210 through the communication interface 230 rather than a computer-readable recording medium. For example, the software elements may be loaded into the memory 210 of the computing device 200 on the basis of a computer program that is installed by files received over the network 40.

The processor 220 may process instructions from a computer program by performing basic arithmetic, logic, and input/output operations. The instructions may be provided to the processor 220 by the memory 210 or the communication interface 230. For example, the processor 220 may execute instructions received according to program code stored in a recording device, such as the memory 210.

The communication interface 230 may provide a function for the computing device 200 to communicate with other devices (for example, the above-described storage devices and the video providing server 20) over the network 40. For example, requests, instructions, data, or files generated by the processor 220 of the computing device 200 according to program code stored in a recording device, such as the memory 210, may be forwarded to other devices over the network 40 under the control of the communication interface 230. Conversely, signals, instructions, data, or files from other devices may be received by the computing device 200 through the communication interface 230 of the computing device 200 over the network 40. Signals, instructions, or data received through the communication interface 230 may be forwarded to the processor 220 or the memory 210, and files may be stored in a storage medium (the above-described persistent storage device) that the computing device 200 may further include.

The input/output interface 240 may provide a means for interfacing with the input device 250 and the output device 260. For example, the input device 250 may include a device, such as a microphone, a keyboard, or a mouse, and the output device 260 may include a device, such as a display, and a speaker. As another example, the input/output interface 240 may be a means for interfacing with a device, such as a touch screen, in which input and output functions are integrated.

The processor 220 according to an embodiment may be realized to perform the methods and algorithms according to the embodiments of FIGS. 3 to 8 that will be described later.

Figure 3:
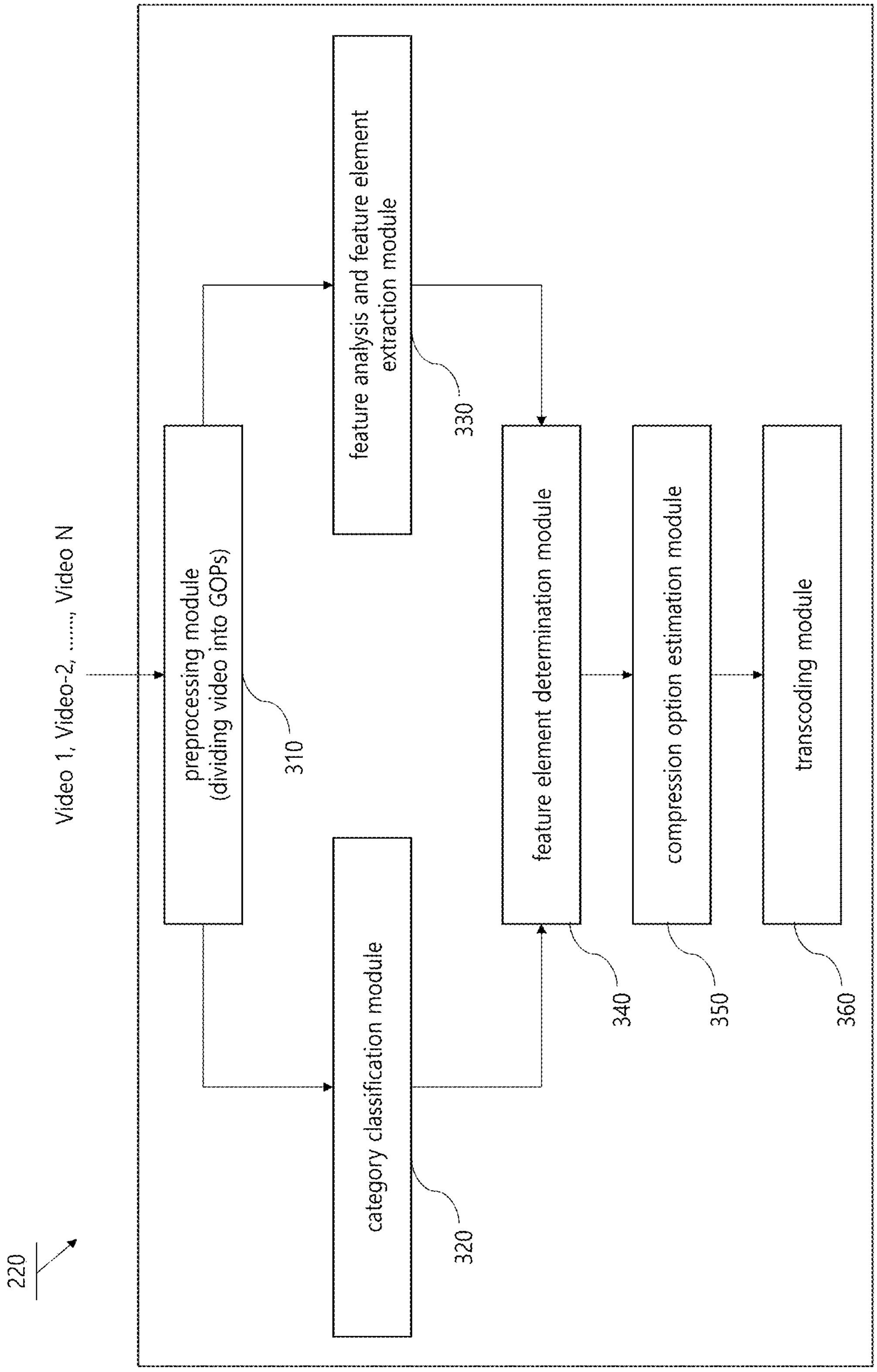
FIG. 3 is a diagram illustrating a functional structure of an AI server according to an embodiment of the present disclosure.

FIG. 3 is a diagram illustrating a functional structure of an AI server according to an embodiment of the present disclosure.

Specifically, FIG. 3 is a diagram illustrating function modules performed by the processor 220 of FIG. 2 described above.

Referring to FIG. 3, the processor 220 may include a preprocessing module 310, a category classification module 320, a feature analysis and feature information extraction module 330, a feature element determination module 340, a compression option estimation module 350, and a transcoding module 360.

The preprocessing module 310 may divide an input video file into GOPs.

The category classification module 320 may classify, into categories, files divided into GOPs. For example, the categories may include at least one selected from the group of a sports category, a news category, a lecture category, a movie category, and other categories, but without being limited thereto, may include many more categories as designed by those skilled in the art. For example, sports categories may be divided into a first sports category with relatively static motion, such as archery, shooting, and weight lifting, and a second sports category with relatively dynamic motion, such as football, basketball, and track and field. For example, lecture categories may be divided into an electronic board lecture category, a blackboard lecture category, and a video conference lecture category. For example, the movie category may be divided into a general movie category and an animation category.

The feature analysis and feature element extraction module 330 may analyze a GOP-by-GOP feature to extract feature information. Herein, the extracted feature information may include video feature information and image feature information.

The feature element determination module 340 may determine an optimal feature element for predicting a compression option for each category. For example, CRF may be selected as a feature element for predicting an optimal compression option for category A.

The compression option estimation module 350 may estimate a compression option value according to a feature element determined corresponding to the category.

The transcoding module 350 may perform GOP-by-GOP encoding by applying an estimated compression option value and then combine the GOP-by-GOP encoded files to generate an entire video file. That is, the transcoding module 350 may generate a video file transcoded corresponding to an input video file.

Figure 4:
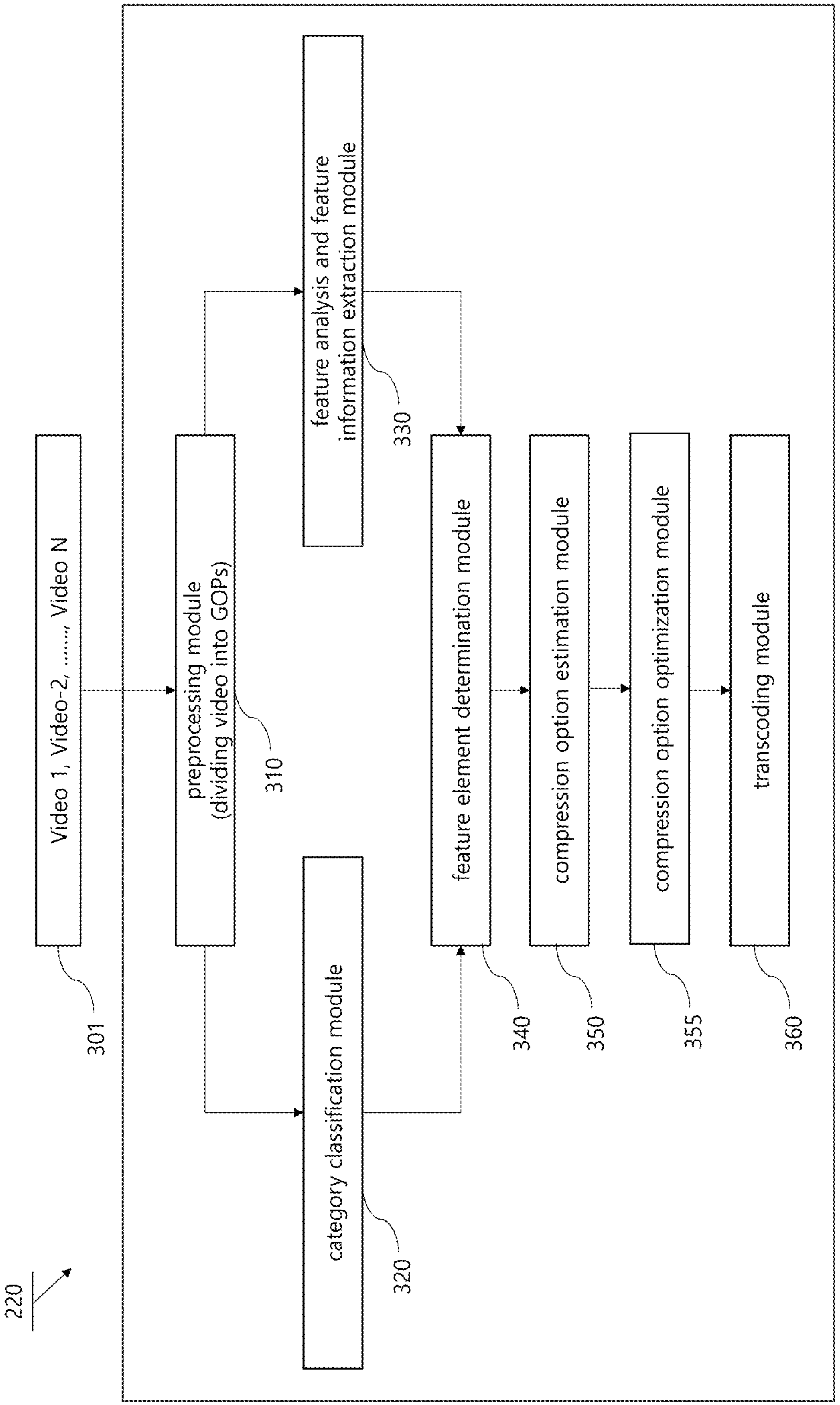
FIG. 4 is a diagram illustrating a functional structure of an AI server according to another embodiment of the present disclosure.

FIG. 4 is a diagram illustrating a functional structure of an AI server according to another embodiment of the present disclosure.

Specifically, FIG. 4 is a diagram illustrating function modules performed by the processor 220 of FIG. 2 described above.

Referring to FIG. 4, the processor 220 may include a preprocessing module 310, a category separation module 320, a feature analysis and feature information extraction module 330, a feature element determination module 340, a compression option estimation module 350, a compression option optimization module 355, and a transcoding module 360.

The description of the preprocessing module 310, the category separation module 320, the feature analysis and feature information extraction module 330, the feature element determination module 340, the compression option estimation module 350, and the transcoding module 360 is replaced by the description of FIG. 3.

The compression option optimization module 355 added in this embodiment may analyze GOP-by-GOP compression efficiency and video quality to optimize a compression option value estimated by the compression option estimation module 350. Herein, compression option optimization according to the present disclosure may analyze compression efficiency and video quality to optimize a compression option without physically encoding an entire video file to be generated by combining GOP-by-GOP files to be encoded.

The compression option optimization module 355 may re-calculate an estimated compression option value on the basis of a result of analyzing GOP-by-GOP compression efficiency and video quality, and may provide the resulting value to the transcoding module 360.

Figure 5:
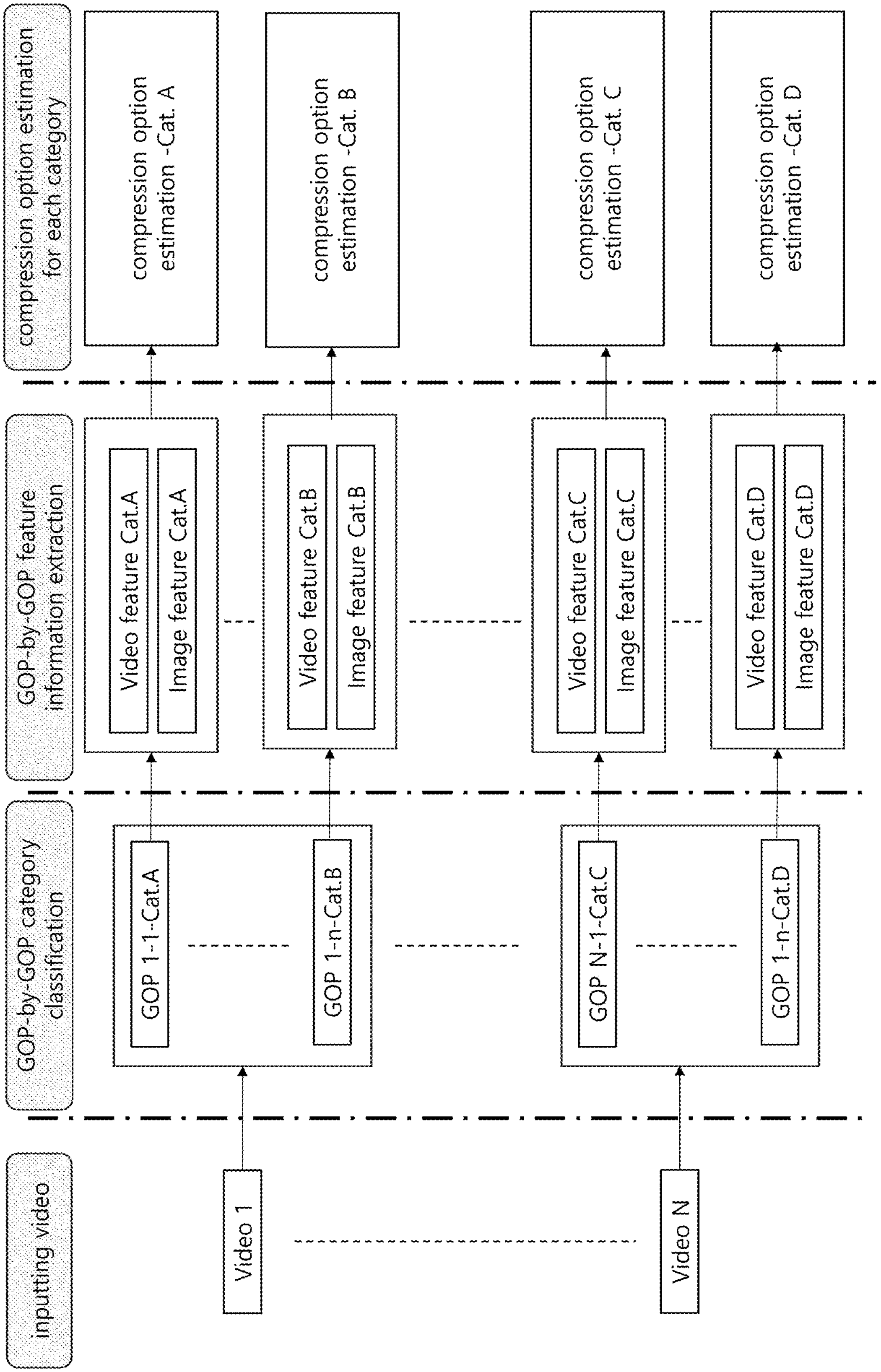
FIG. 5 is a diagram illustrating a process of estimating a compression option for each category according to an embodiment of the present disclosure.

FIG. 5 is a diagram illustrating a process of estimating a compression option for each category according to an embodiment of the present disclosure.

Referring to FIG. 5, each input video file (Video 1 to Video N) may be divided into GOPs, and the GOPs may be classified into categories.

Feature information for each GOP classified into a category may be extracted, and then a compression option for each category may be estimated.

Figure 6:
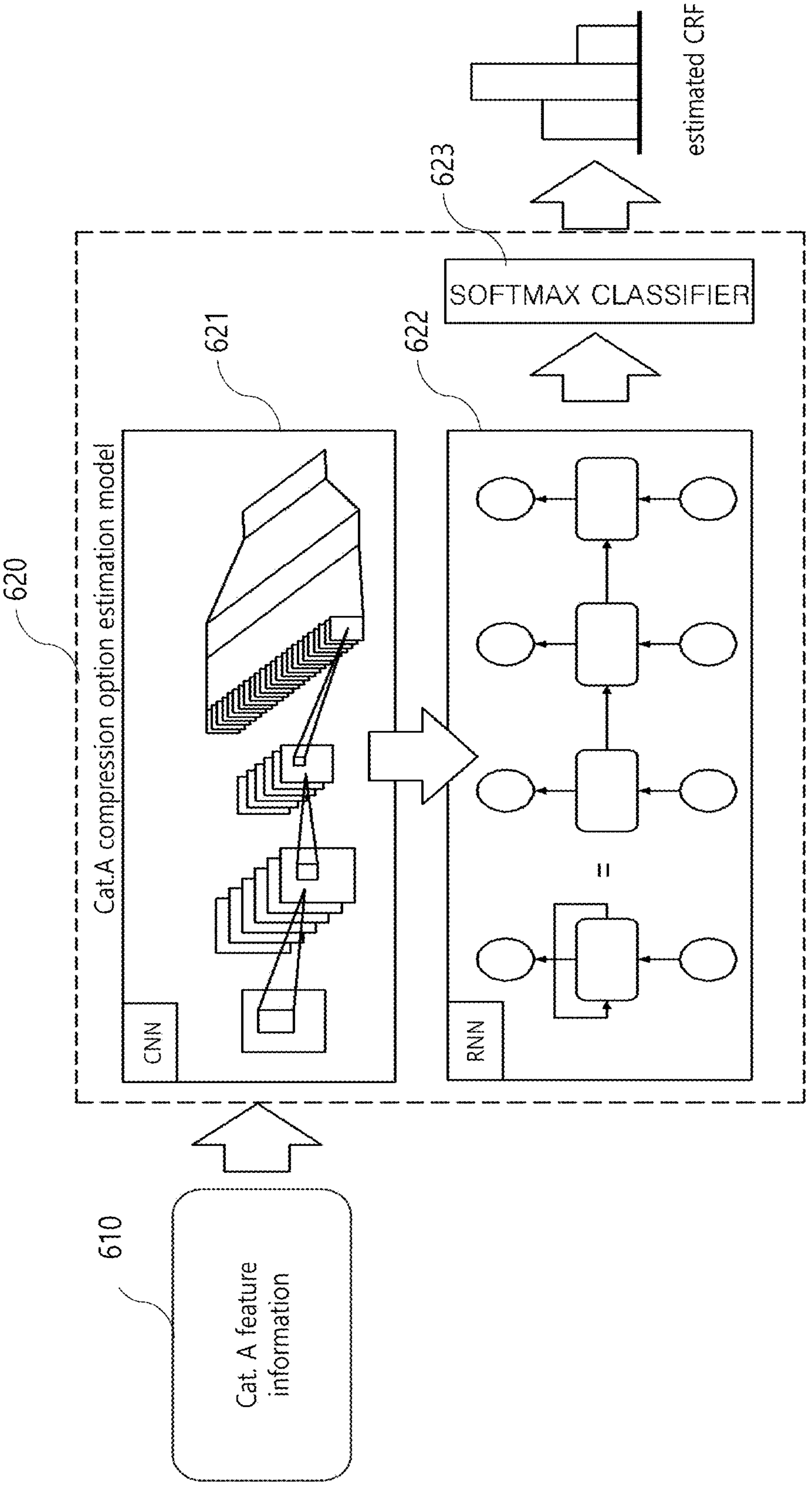
FIG. 6 is a diagram illustrating a process of estimating CRF that is a compression option corresponding to category A according to an embodiment of the present disclosure.

FIG. 6 is a diagram illustrating a process of estimating CRF that is a compression option corresponding to category A according to an embodiment of the present disclosure.

Referring to FIG. 6, feature information 610 extracted corresponding to category A may be input to a category A compression option estimation model 620 pre-trained.

The category A compression option estimation model 620 according to an embodiment may include at least one selected from the group of a convolution neural network (CNN) model 621, a recurrent neural network (RNN) 621, and a Softmax classifier 623. Herein, the category A compression option estimation model 620 may be trained to classify the class of CRF that is a feature element corresponding to category A selected using a feature element estimation model, which is a deep learning model trained through supervised learning.

Figure 7:
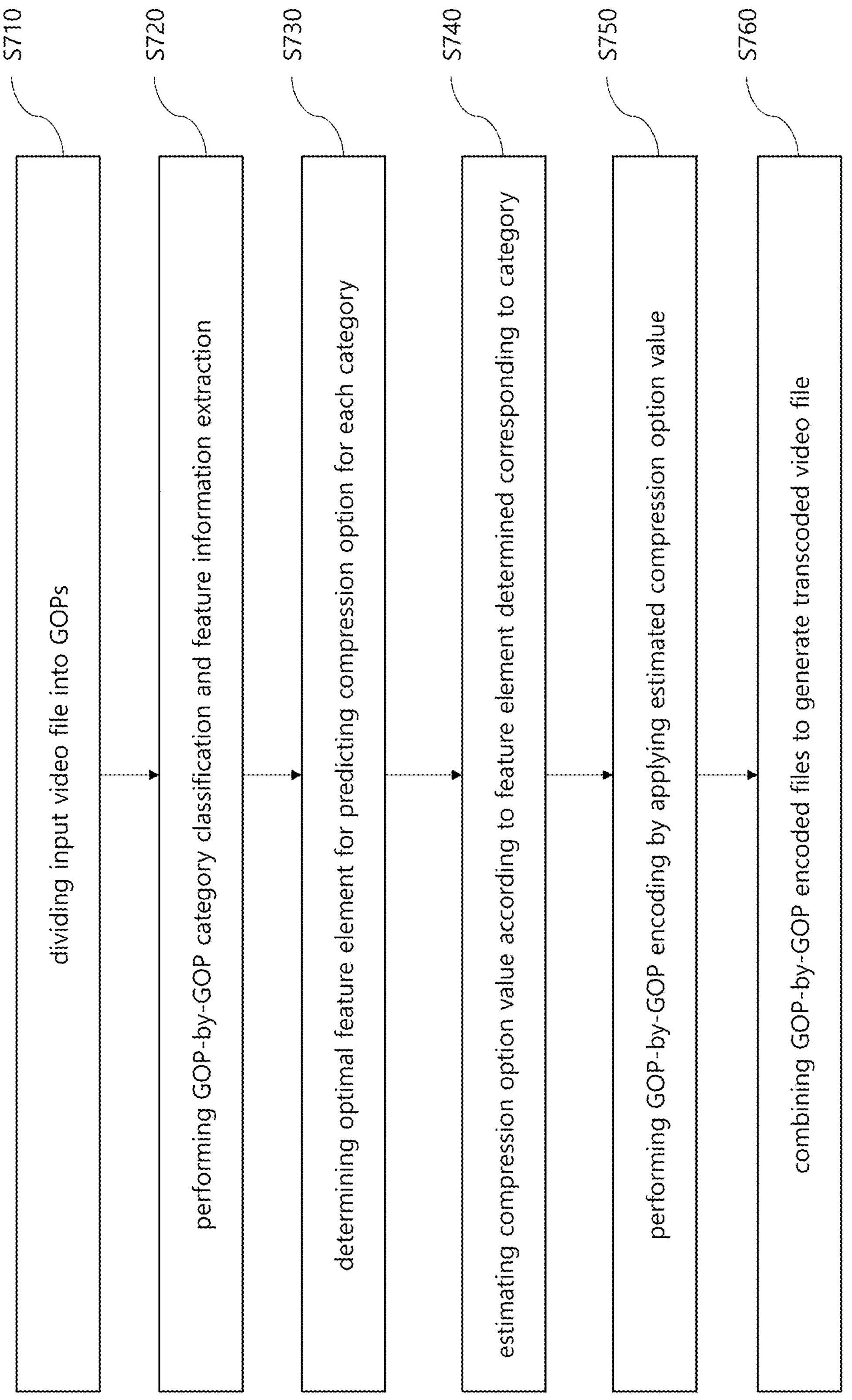
FIG. 7 is a flowchart illustrating a method for optimizing encoding through video category classification based on artificial intelligence according to an embodiment of the present disclosure.

FIG. 7 is a flowchart illustrating a method for optimizing encoding through video category classification based on artificial intelligence according to an embodiment of the present disclosure.

Referring to FIG. 7, the AI server 30 may divide an input video file into GOPs in step S710.

The AI server 30 may perform category classification and feature information extraction on the basis of each GOP resulting from division in step S720.

The AI server 30 may determine an optimal feature element for predicting a compression option for each category in step S730.

The AI server 30 may estimate the compression option value according to the feature element determined corresponding to the category in step S740.

The AI server 30 may perform GOP-by-GOP encoding corresponding to the category by applying the estimated compression option value in step S750.

The AI server 30 may combine the GOP-by-GOP encoded files to generate an entire transcoded video file in step S760.

Figure 8:
FIG. 8 is a flowchart illustrating a method for optimizing encoding through video category classification based on artificial intelligence according to another embodiment of the present disclosure.

FIG. 8 is a flowchart illustrating a method for optimizing encoding through video category classification based on artificial intelligence according to another embodiment of the present disclosure.

Referring to FIG. 8, the AI server 30 may divide an input video file into GOPs in step S810.

The AI server 30 may perform category classification and feature information extraction on the basis of each GOP resulting from division in step S820.

The AI server 30 may determine an optimal feature element for predicting a compression option for each category in step S830.

The AI server 30 may estimate the compression option value according to the feature element determined corresponding to the category in step S840.

The AI server 30 may analyze GOP-by-GOP compression efficiency and video quality to optimize the estimated compression option value in step S850.

The AI server 30 may perform GOP-by-GOP encoding corresponding to the category by applying the optimized compression option value in step S860.

The AI server 30 may combine the GOP-by-GOP encoded files to generate an entire transcoded video file in step S870.

The above description is merely intended to exemplarily describe the technical spirit of the present disclosure, and those skilled in the art will appreciate that various changes and modifications are possible without departing from the essential features of the present disclosure.

Therefore, the embodiments disclosed in the present disclosure are not intended to restrict the technical spirit of the present disclosure and are merely intended to describe the present disclosure, and the scope of the present disclosure is not limited by those embodiments. The protection scope of the present disclosure should be defined by the accompanying claims, and the technical spirit of all equivalents thereof should be construed as being included in the scope of the present disclosure.

What is claimed is:

1. A method for optimizing video encoding based on artificial intelligence, the method comprising:
- dividing an input video file into groups of pictures (GOPs);
- performing classification of a category and extraction of feature information on each of the GOPs resulting from division;
- estimating, based on extraction of the feature information, an estimated optimal compression option value corresponding to the classification of the category by determining an optimal feature element to predict the estimated optimal compression option value for the classification of the category;
- analyzing GOP-by-GOP compression efficiency and video quality using artificial intelligence to generate an optimized compression option value;
- performing GOP-by-GOP encoding by applying the optimized compression option value for the classification of the category on the each of the GOPs to generate GOP-by-GOP encoded files; and combining the GOP-by-GOP encoded files to generate an entire video file transcoded, wherein the analyzing the GOP-by-GOP compression efficiency and video quality comprises re-calculating the estimated optimal compression option value using a pre-trained compression option optimization model on a basis of a result of analyzing the GOP-by-GOP compression efficiency and video quality, without physically encoding an entire video file to be generated by combining the GOP-by-GOP encoded files.

2. The method of claim 1, wherein the optimal feature element includes a video feature element and an image feature element, and the video feature element includes at least one selected from a group of bitrates, constant rate factor (CFR), quantization, framerate, interlace, frame type, a size of the GOPs, and variation, and the image feature element includes complexity or resolution or both.

3. The method of claim 1, wherein the category includes at least one selected from a group of a sports category, a news category, a lecture category, a movie category, and other categories.

4. A computing device, comprising:

a processor configured to execute instructions; and a memory configured to store the instructions, wherein the instructions are designed to divide an input video file into groups of pictures (GOPs), perform classification of a category and extraction of feature information on each of the GOPs resulting from division, estimate, based on extraction of the feature information, an estimated optimal compression option value corresponding to the classification of the category by determining an optimal feature element to predict the estimated optimal compression option value for the classification of the category, analyze GOP-by-GOP compression efficiency and video quality using artificial intelligence to generate an optimized compression option value, perform GOP-by-GOP encoding by applying the optimized compression option value for the classification of the category on the each of the GOPs to generate GOP-by-GOP encoded files, and combine the GOP-by-GOP encoded files to generate an entire video file transcoded, wherein the GOP-by-GOP compression efficiency and video quality is analyzed re-calculating the estimated optimal compression option value using a pre-trained compression option optimization model on a basis of a result of analyzing the GOP-by-GOP compression efficiency and video quality, without physically encoding an entire video file to be generated by combining the GOP-by-GOP encoded files.

5. The computing device of claim 4, wherein the optimal feature element includes a video feature element and an image feature element, and the video feature element includes at least one selected from a group of bitrates, constant rate factor (CFR), quantization, framerate, interlace, frame type, a size of the GOPs, and variation, and the image feature element includes complexity or resolution or both.

6. The computing device of claim 4, wherein the category includes at least one selected from a group of a sports category, a news category, a lecture category, a movie category, and other categories.

* * * * *